(12) United States Patent
Teague

(10) Patent No.: US 10,961,603 B2
(45) Date of Patent: Mar. 30, 2021

(54) STRUCTURAL COMPONENT INCLUDING A TEMPERED TRANSITION ZONE

(71) Applicant: Richard Allen Teague, Jacksboro, TN (US)

(72) Inventor: Richard Allen Teague, Jacksboro, TN (US)

(73) Assignee: MAGNA INTERNATIONAL INC., Aurora (CA)

( * ) Notice: Subject to any disclaimer, the term of this patent is extended or adjusted under 35 U.S.C. 154(b) by 80 days.

(21) Appl. No.: 15/640,501

(22) Filed: Jul. 1, 2017

(65) Prior Publication Data

US 2017/0298469 A1      Oct. 19, 2017

Related U.S. Application Data

(62) Division of application No. 14/543,482, filed on Nov. 17, 2014, now Pat. No. 9,708,685.

(Continued)

(51) Int. Cl.
*C21D 9/50*      (2006.01)
*B23K 31/02*    (2006.01)
(Continued)

(52) U.S. Cl.
CPC ............... *C21D 9/50* (2013.01); *B23K 26/26* (2013.01); *B23K 26/323* (2015.10); *B23K 31/02* (2013.01);
(Continued)

(58) Field of Classification Search
CPC .. B23K 2103/04; B23K 26/26; B23K 26/323; B23K 31/02; B32B 15/012; B32B 15/013; B62D 25/04; B62D 29/007; C21D 1/42; C21D 1/673; C21D 2221/01; C21D 9/50; C22C 21/02; C22C 38/02; C22C 38/04; C22C 38/18; C22C 38/32; Y10T 403/478
(Continued)

(56) References Cited

U.S. PATENT DOCUMENTS 5,250,783 A     10/1993  Nishi et al.
5,340,429 A  *   8/1994  Duffy ................... B31D 3/0223
                                                      156/285

(Continued)

FOREIGN PATENT DOCUMENTS

CN        102409153 A      4/2012
DE    102007038496 A1      2/2009
(Continued)

*Primary Examiner* — Jie Yang
(74) *Attorney, Agent, or Firm* — Dickinson Wright PLLC

(57) ABSTRACT

The invention provides a hot stamped structural component (20) for an automotive vehicle, such as a B-pillar, including a first part (22) formed of a high strength steel material joined to a second part (24) formed of a high ductility steel material. The structural component (20) also includes a locally tempered transition zone (26) along the joint (28) to reduce the potential for failure along the joint (28). The transition zone (26) has strength and ductility levels between the strength and ductility levels of the remaining portions of the first and second parts (22, 24). The tempering step can be incorporated into a laser trimming cell or assembly cell, and thus the transition zone (26) can be created without adding an additional process step or increasing cycle time.

17 Claims, 1 Drawing Sheet

Related U.S. Application Data

(60) Provisional application No. 61/908,379, filed on Nov. 25, 2013.

(51) Int. Cl.

| | | |
|---|---|---|
| *C21D 1/42* | (2006.01) | |
| *C22C 38/32* | (2006.01) | |
| *C22C 38/04* | (2006.01) | |
| *C22C 38/02* | (2006.01) | |
| *B62D 25/04* | (2006.01) | |
| *B62D 29/00* | (2006.01) | |
| *B23K 26/26* | (2014.01) | |
| *B23K 26/323* | (2014.01) | |
| *C21D 1/673* | (2006.01) | |
| *B32B 15/01* | (2006.01) | |
| *C22C 38/18* | (2006.01) | |
| *C22C 21/02* | (2006.01) | |
| *B23K 101/00* | (2006.01) | |
| *B23K 103/04* | (2006.01) | |

(52) U.S. Cl.
CPC .......... *B32B 15/012* (2013.01); *B32B 15/013* (2013.01); *B62D 25/04* (2013.01); *B62D 29/007* (2013.01); *C21D 1/42* (2013.01); *C21D 1/673* (2013.01); *C22C 21/02* (2013.01); *C22C 38/02* (2013.01); *C22C 38/04* (2013.01); *C22C 38/18* (2013.01); *C22C 38/32* (2013.01); *B23K 2101/006* (2018.08); *B23K 2103/04* (2018.08); *C21D 2221/01* (2013.01); *Y02P 10/25* (2015.11); *Y10T 403/478* (2015.01)

(58) Field of Classification Search
USPC .......................................................... 148/526
See application file for complete search history.

(56) References Cited

U.S. PATENT DOCUMENTS

| | | | |
|---|---|---|---|
| 5,628,449 A | 5/1997 | Onuma et al. | |
| 5,861,067 A | 1/1999 | Hetzner | |
| 5,879,480 A | 3/1999 | Hetzner | |
| 5,906,053 A | 5/1999 | Turner et al. | |
| 5,960,825 A | 10/1999 | Scancarello et al. | |
| 6,139,462 A | 10/2000 | Gage et al. | |
| 6,218,642 B1 | 4/2001 | Christmas et al. | |
| 6,335,506 B2 | 1/2002 | Christmas et al. | |
| 6,454,877 B1 | 9/2002 | Kumar et al. | |
| 6,485,027 B1 | 11/2002 | Carrie et al. | |
| 6,511,559 B2 | 1/2003 | Brenner et al. | |
| 6,585,148 B2 | 7/2003 | Aono et al. | |
| 6,608,285 B2 | 8/2003 | Lefebvre et al. | |
| 6,669,275 B2 | 12/2003 | Frasher et al. | |
| 6,833,199 B2 | 12/2004 | Fujita et al. | |
| 6,857,255 B1 | 2/2005 | Wilkey et al. | |
| 6,957,848 B2 | 10/2005 | Walther | |
| 7,077,920 B2 | 7/2006 | Gehringhoff | |
| 7,154,067 B2 | 12/2006 | Yoshii | |
| 7,416,621 B2 | 8/2008 | Knott | |
| 7,475,478 B2 | 1/2009 | McCrink et al. | |
| 7,540,402 B2 | 6/2009 | McCrink et al. | |
| 7,562,807 B2 | 7/2009 | Coleman et al. | |
| 7,591,410 B2 | 9/2009 | Coleman et al. | |
| 7,618,503 B2 | 11/2009 | McCrink et al. | |
| 8,292,354 B2 | 10/2012 | Bodin et al. | |
| 8,371,149 B2 | 2/2013 | Vogel | |
| 8,382,197 B2 | 2/2013 | Eberlein | |
| 8,555,507 B2 | 10/2013 | Lee et al. | |
| 8,691,032 B2 * | 4/2014 | Thomas | C21D 1/673 148/643 |
| 8,894,781 B2 * | 11/2014 | Batiste | C21D 1/18 148/624 |
| 8,910,999 B2 * | 12/2014 | Schurter | B60J 5/0415 296/146.5 |
| 2004/0108306 A1 | 6/2004 | Wiezbowski et al. | |
| 2004/0188394 A1 | 9/2004 | Becker et al. | |
| 2004/0251711 A1 | 12/2004 | Walther | |
| 2006/0243353 A1 | 11/2006 | Milam | |
| 2008/0115863 A1 | 5/2008 | McCrink et al. | |
| 2008/0128053 A1 | 6/2008 | Jansen et al. | |
| 2008/0156402 A1 | 7/2008 | Coleman et al. | |
| 2008/0245777 A1 | 10/2008 | Cremerius et al. | |
| 2008/0302450 A1 | 12/2008 | Kaplan | |
| 2009/0045586 A1 | 2/2009 | Cantow | |
| 2009/0057287 A1 * | 3/2009 | Ganesh | B23K 9/232 219/148 |
| 2009/0250967 A1 | 10/2009 | Bodin | |
| 2010/0086803 A1 | 4/2010 | Patberg | |
| 2010/0117400 A1 | 5/2010 | Eberlein | |
| 2012/0006089 A1 | 1/2012 | Pohl et al. | |
| 2012/0186705 A1 | 7/2012 | Sikora et al. | |
| 2012/0304448 A1 | 12/2012 | Hartmann et al. | |
| 2013/0068741 A1 | 3/2013 | Pillai et al. | |
| 2013/0078031 A1 | 3/2013 | Nakamura et al. | |
| 2013/0088037 A1 | 4/2013 | Schurter et al. | |
| 2013/0136945 A1 | 5/2013 | Charest et al. | |
| 2013/0180969 A1 | 7/2013 | Cheng et al. | |
| 2014/0000081 A1 | 1/2014 | Xu | |

FOREIGN PATENT DOCUMENTS

| | | |
|---|---|---|
| DE | 102009007309 A1 | 8/2010 |
| DE | 202012000616 U1 | 2/2012 |
| EP | 1435268 B1 | 1/2008 |
| IN | 600KOL2012 A | 11/2013 |
| KR | 1020120134710 A | 12/2012 |
| WO | 2005080686 A1 | 9/2005 |
| WO | 2008031210 A1 | 3/2008 |
| WO | 2008088834 A1 | 7/2008 |
| WO | 2008129277 A1 | 10/2008 |
| WO | 2010026723 A1 | 3/2010 |
| WO | 2011056923 A1 | 5/2011 |
| WO | 2011131809 A1 | 10/2011 |
| WO | 2012156084 A1 | 11/2012 |
| WO | 2013013305 A1 | 1/2013 |
| WO | 2013037353 A2 | 3/2013 |
| WO | 2013047939 A1 | 4/2013 |
| WO | 2013072055 A1 | 5/2013 |
| WO | 2013127655 A1 | 9/2013 |
| WO | 2013129408 A1 | 9/2013 |
| WO | 2013135847 A1 | 9/2013 |
| WO | 2014010550 A1 | 1/2014 |

* cited by examiner

STRUCTURAL COMPONENT INCLUDING A TEMPERED TRANSITION ZONE

CROSS-REFERENCE TO PRIOR APPLICATIONS

This U.S. Divisional Patent Application claims priority to U.S. patent application Ser. No. 14/543,482 filed Nov. 17, 2014 entitled "Structural Component Including A Tempered Transition Zone", which claims the benefit of U.S. Provisional Patent Application Ser. No. 61/908,379 filed Nov. 25, 2013, entitled "Structural Component Including A Tempered Transition Zone," the entire disclosures of the applications being considered part of the disclosure of this application and hereby incorporated by reference.

BACKGROUND OF THE INVENTION

1. Field of the Invention

The invention relates generally to hot formed structural components for automotive vehicles, and methods of manufacturing the same.

2. Related Art

Structural components for automotive vehicles, such as beams, pillars, and rails, often times comprise a first zone having a high strength, and a second zone having a high ductility. Processes exist for achieving such zones of strength. Those processes can include heating or cooling different zones of a single part to different temperatures and/or at different rates in the forming die.

Structural components with zones of different strength and ductility can also be achieved using welded steel blanks. This technique includes welding a first blank formed of a high strength material to a second blank formed of a high ductility material, and then hot forming the welded blanks to provide the structural component. Among other companies, ArcelorMittal has developed two materials intended for tailor welded structural components in automotive vehicles, including, in the case of ArcelorMittal, such components known and marketed as Usibor® which is high strength and Ductibor® which is high ductility.

SUMMARY OF THE INVENTION

The invention provides for a structural component comprising of a first part and a second part each formed of a steel material and presenting a joint therebetween. The first part has a first ductility, and the second part has a second ductility which is greater than the first ductility. A transition zone is formed in a portion of the first part adjacent the joint and/or a portion of the second part adjacent the joint. The transition zone has a third ductility between the first ductility and the second ductility.

The invention also provides a method of manufacturing the structural component including the transition zone. The method includes providing the first part and the second part presenting the joint therebetween, wherein the second part has the second ductility which is greater than the first ductility of the first part. The method further includes heating a portion of the first part adjacent the joint and/or a portion of the second part adjacent the joint to form the transition zone having the third ductility which is between the first ductility and the second ductility.

The ductility of the transition zone adjacent the joint allows for energy absorption upon impact, without separation or fracture along the joint. Thus, when the structural component is used in an automotive vehicle, the transition zone reduces the potential for failure along the joint during a crash. In addition to providing tempered properties which assist in energy absorption and vehicle crash strategy, the structural component and method provided by the invention is able to utilize existing materials, such as Usibor® for the high strength first part and Ductibor® for the high ductility second part.

In addition, the localized transition zone of the structural component can be formed by tempering using a relatively inexpensive induction heating system, for example in a laser trimming cell or assembly cell. Thus, no indirect process is required to form the transition zone, resulting in no additional cost for tooling and maintenance thereof, or related quality control costs, which are typically required for in-die tempering processes. Forming the transition zone in the laser trimming cell or assembly cell also provides for reduced process steps and cycle time. Since the method of the invention is less complex than the tempering methods of the prior art, less capital investment is required. In addition, the size of the transition zone can be adjusted by simply changing an induction coil in the post-process cell, rather than making major die modifications as in the tempering methods of the prior art.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 2:
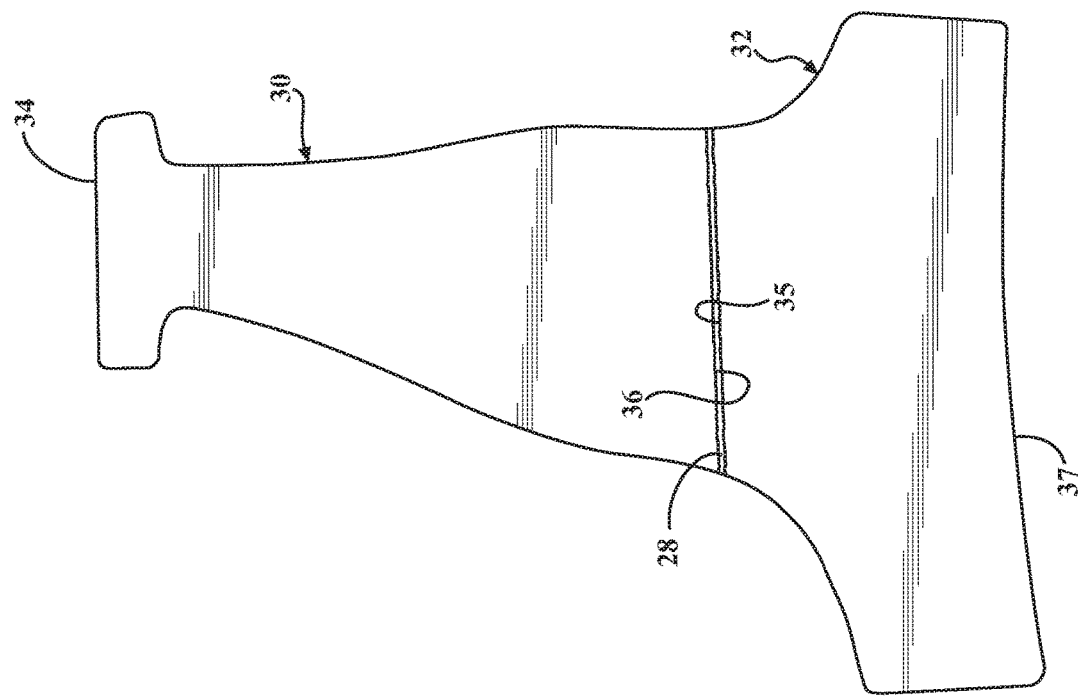
FIG. 2 illustrates a first blank welded to a second blank which are used to form the structural component of FIG. 1.
Figure 1:
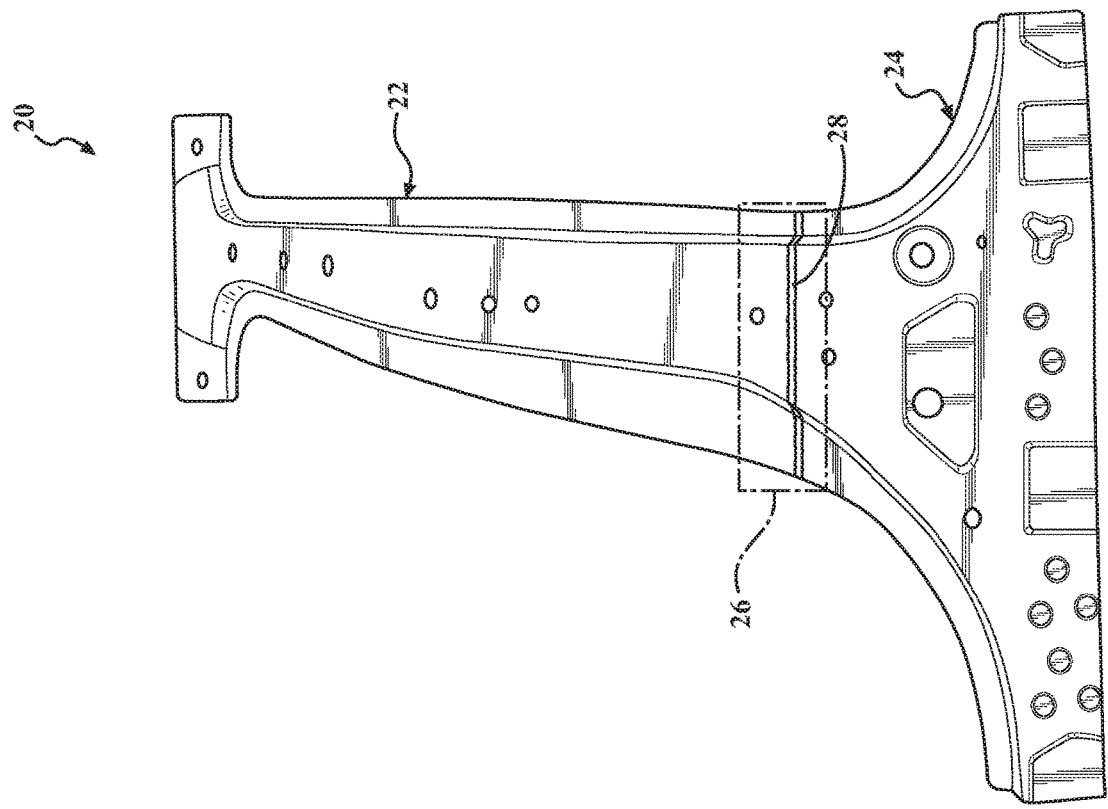
FIG. 1 illustrates an exemplary hot stamped structural component including a first part formed of a high strength material welded to a second part formed of a high ductility material and including a transition zone adjacent the welded joint.

The invention provides a hot formed structural component 20, such as a B-pillar for an automotive vehicle, including a first part 22 having a high strength joined to a second part 24 having a high ductility, and a method of manufacturing the structural component 20, as shown in FIG. 1. A locally tempered transition zone 26 extends along a region of the structural component 20 adjacent the joint 28. The transition zone 26 typically comprises a portion of the first part 22 adjacent the joint 28, for example less than 50% of the volume of the first part 22. The transition zone 26 can also comprise a portion of the second part 24 adjacent the joint 28, for example less than 50% of the volume of the second part 24. The transition zone 26 has a ductility level between the ductility levels of the adjacent portions of the first part 22 and the second part 24. The transition zone 26 can also have a strength different from the strength of the adjacent portions of the first part 22 and the second part 24. In an exemplary embodiment, the structural component 20 is efficiently manufactured by hot stamping sheet steel blanks, for example Usibor® and Ductibor® blanks 30, 32, which are shown in FIG. 2, and then tempering a portion of the hot stamped parts 22, 24 adjacent the joint 28 to provide the transition zone 26, as shown in FIG. 1. The transition zone 26 provides controlled tempered properties in an automotive vehicle component. For example, the ductility of the transition zone 26 assists in energy absorption during impact and reduces the potential for fracture or separation along the joint 28.

The first blank 30 used to form the high strength first part 22 of the structural component 20 comprises a steel material, referred to as the first steel material. Various different steel alloys can be used, however, in the exemplary embodiment, the first blank 30 comprises a coated, press hardened steel alloy, such as Usibor® 1500P. This steel alloy includes carbon in an amount not greater than 0.25 weight percent (wt. %), manganese in an amount not greater than 1.4 wt. %, silicon in an amount not greater than 0.35 wt. %, chromium in an amount not greater than 0.3 wt. %, boron in an amount not greater than 0.005 wt. %, and a balance of iron. Prior to hot forming, the first blank 30 of the exemplary embodiment has a microstructure comprising ferrite and perlite. The first blank 30 also has an ultimate tensile strength (UTS) ranging from 500 MPa to 700 MPa; a yield strength (YS) ranging from 350 MPa to 550 MPa; and an elongation ($e_f$) of at least 10% ($L_0$=80 mm and th<3 mm).

The geometry of the first blank 30 can vary depending on the type of structural component 20 to be formed. Typically, the first blank 30 includes a first end 34 extending longitudinally to a second end 36. In the exemplary embodiment, the first blank 30 is designed for use as a B-pillar of an automotive vehicle and thus includes a foot portion at the first end 34 and a longitudinal section extending from the foot portion to the second end 36, as shown in FIG. 2. However, the geometry of the first blank 30 could alternatively be designed to provide another type of pillar, rail, beam, reinforcement, ring, frame, or body component for an automotive vehicle. The first blank 30 could also be designed for non-automotive applications. The thickness of the first blank 30 can be uniform or vary along its length. The thickness typically ranges from 1 mm to 2 mm for automotive applications, and in the exemplary embodiment, the thickness of the first blank 30 is about 1.5 mm.

The first blank 30 is preferably coated to prevent corrosion, increase heating rate, and prevent cracks in the steel material during the hot forming process. In the exemplary embodiment, the coating includes aluminum in an amount of 90 wt. % and silicon in an amount of 10 wt. %. However, other types of coatings could be used, such as a zinc coating. The coating typically has an average thickness of 25 μm when applied to the first blank 30 having a thickness ranging from 1 mm to 2 mm.

The second blank 32 used to form the high ductility second part 24 of the structural component 20 is also formed of a steel material, referred to as the second steel material. The second steel material can also comprise various different types of steel material. In the exemplary embodiment, the second blank 32 comprises a non-coated, press hardened steel alloy, such as Ductibor® 500P.

The geometry of the second blank 32 can vary depending on the type of structural component 20 to be formed. However, the second blank 32 typically includes a first end 35 extending longitudinally to a second end 37. In the exemplary embodiment, wherein the second blank 32 is designed for use in a B-pillar, the second blank 32 includes a longitudinal section extending from the first end 35 to the second end 37, with a foot portion at the second end 37, as shown in FIG. 2. In this embodiment, the width of the first end 35 of the second part 24 is approximately equal to the width of the second end 36 of the first part 22. Alternatively, the geometry of the second blank 32 could be designed to provide another type of pillar, rail, beam, reinforcement, ring, frame, or body component for an automotive vehicle. The second blank 32 could also be designed for non-automotive applications. The thickness of the second blank 32 can be uniform or vary along its length. However, the thickness typically ranges from 1 mm to 2 mm for automotive applications. In the exemplary embodiment, the second blank 32 has a thickness of 1.5 mm.

The method of manufacturing the structural component 20 typically includes joining the first blank 30 to the second blank 32 to form the joint 28. In the exemplary embodiment, the second end 36 of the first blank 30 is laser welded to the first end 35 of the second blank 32 to form the joint 28 (i.e., weld), as shown in FIG. 2. However, various other types of joining techniques could be used, such as resistance spot welding, arc welding, metal inert gas (MIG) welding, metal active gas (MAG) welding, and brazing.

Once the first blank 30 and the second blank 32 are joined together, the blanks 30, 32 are hot formed to provide the structural component 20 with a desired shape. Various different hot forming processes could be used. In the exemplary embodiment, the hot forming process includes hot stamping the first blank 30 and the second blank 32 after the blanks 30, 32 are joined together. The exemplary hot stamping process first includes heating the welded blanks 30, 32 in a furnace to a temperature of 900° C. to 950° C. for 5 to 10 minutes. During this step, the steel material of the first and second blanks 30, 32 transforms to an austenitic microstructure. Next, the exemplary process includes transferring the heated blanks 30, 32 to a forming die, wherein the transfer time from the furnace to the forming die is preferably less than 7 seconds. The method next includes stamping the heated blanks 30, 32 in the die while the blanks 30, 32 are still at a temperature of 600° C. to 800° C. The die forms the heated blanks 30, 32 into the first and second parts 22, 24 having a predetermined shape. After the stamping step, but while the die is still closed and the parts 22, 24 are still in the die, the exemplary method includes quenching the first part 22 at a speed greater than 50° C. per second and the second part 24 at a speed greater than 30° C. per second. The quenching step could alternatively include water quenching at greater speeds. During the quenching step, the microstructure of the first part 22 transforms from austenite to martensite, and the microstructure of the second part 24 transforms from austenite to a mixture of ferrite and martensite. As stated above, this hot stamping process is provided only as an example, and various other hot stamping or hot forming processes could be used.

After the hot forming process, the strength of the first part 22 is still greater than the strength of the second part 24, and the ductility of the second part 24 is still greater than the ductility of the first part 22. At this point during the process, the strength and ductility are typically uniform throughout the first part 22 and uniform throughout the second part 24. In the exemplary embodiment, wherein the first part 22 is formed from Usibor® 1500P, the first part 22 has an ultimate tensile strength (UTS) ranging from 1,400 MPa to 1,600 MPa; a yield strength (YS) ranging from 1,000 MPa to 1,200 MPa; an elongation ($e_f$) of at least 5 to 6% ($L_0$=80 mm and th<3 mm); and a hardness less than 490. The second part 24 of the exemplary embodiment, which is formed from Ductibor® 500P, has an ultimate tensile strength (UTS) ranging from 550 MPa to 700 MPa; a yield strength (YS) ranging from 370 MPa to 470 MPa; and an elongation ($e_f$) of at least 17% ($L_0$=80 mm and th<3 mm). However, the properties of the first part 22 and the second part 24 can vary from this example.

The method of manufacturing the structural component 20 further includes heating at least one region of the first part 22 and/or at least one region of the second part 24 along and adjacent the joint to form the transition zone 26. For example, the transition zone 26 can be located in the first part 22 alone, the second part 24 alone, or in a portion of both the first part 22 and the second part 24. This heating step is conducted outside the forming die after the hot stamping step, and it is preferably conducted in a laser trimming cell or assembly cell. Alternatively, the heating step can be provided as a secondary process. The heating step used to form the transition zone 26 can include tempering, annealing, or any other type of heat treatment. The transition zone 26 introduced into the structural component 20 has a ductility level between the ductility levels of the adjacent portions of the first part 22 and the second part 24 to absorb energy during a crash. The transition zone 26 can also have a strength level between or different from the strength levels of the adjacent portions of the first part 22 and the second part 24. The ductility of the transition zone 26 can be determined by the elongation ($e_f$), and the strength of the transition zone 26 can be determined by the ultimate tensile strength (UTS) or yield strength (YS). The time and temperature of the heating step will vary depending on the steel material and thickness of the blanks 30, 32. In addition, the time and temperature can be adjusted to meet the desired tempered properties for each particular application.

In the exemplary embodiment, the step of introducing the transition zone 26 includes locally tempering a portion of the first part 22 and locally tempering a portion of the second part 24 adjacent the laser weld joint 28. The tempered portion of the first part 22 is located adjacent the second end 36 of the first part 22, and the tempered portion of the second part 24 is located adjacent the first end 35 of the second part 24, as shown in FIG. 1. This tempering step is conducted after the blanks 30, 32 are hot stamped, using an induction heating system incorporated into the laser trimming cell or the assembly cell. The induction heating system includes at least one heating coil which heats a portion of the structural component 20 along and adjacent the laser weld joint 28 to a certain temperature. A form control mechanism can also be used to control the geometry of the transition zone 26 during the heating step. In addition, a monitoring or thermal imaging system for controlling the temperature of the transition zone 26 during the heating step is provided. However, another technique or other equipment could be used to heat the structural component 20 adjacent the joint 28 and form the transition zone 26, for example, by a laser.

After the tempering step, the ductility of the transition zone 26 is greater than the ductility of the first part 22 outside of the transition zone 26 and less than the ductility of the second part 24 outside of the transition zone 26. The strength of the transition zone 26 can also be different from the strength of the first part 22 and the second part 24 outside of the transition zone 26. For example, the strength of the transition zone 26 could be greater than the strength of the second part 24 outside of the transition zone 26 and less than the strength of the first part 22 outside of the transition zone 26. The strength and ductility can be constant or can vary along the length of the first part 22 and the second part 24. The strength and ductility of the transition zone 26 can also be constant or vary continuously along the length of the transition zone 26. For example, the strength of the transition zone 26 can decrease continuously in a direction moving from the first part 22 to the second part 24, and the ductility can increase continuously in a direction moving from the first part 22 to the second part 24.

The method of the present invention requires tempering or heating only the transition zone 26, which is small relative to the tempered regions of comparative hot stamped components, and therefore less capital investment is required. The dimensions of the transition zone 26 can also vary. In one embodiment, at least 50% of the volume of the first part 22 has the first ductility and at least 50% of the volume of the second part 24 has the second ductility. Typically, the transition zone 26 typically comprises a minority of the volume of the first part 22 and/or a minority of the volume of the second part 24.

The area of the transition zone 26 can also be easily adjusted. For example, the area can be adjusted by simply changing the induction coil of the heating system, rather than making major die modifications as in the tempering methods of the prior art. The thickness of the transition zone 26 can also vary, but typically the thickness of the transition zone 26 is approximately equal to the thickness of the adjacent portions of the first and second parts 22, 24.

In the exemplary embodiment, the microstructure of the transition zone 26 includes a mixture of ferrite and martensite. The portion of the transition zone 26 located in the first part 22 includes more martensite than the portion of the transition zone 26 located in the second part 24. Thus, the strength of the transition zone 26 decreases continuously along its length and the ductility increases continuously along its length, moving from the first part 22 to the second part 24. In the exemplary embodiment, when the Usibor® and Ductibor® blanks 30, 32 are used, the ultimate tensile strength (UTS) of the transition zone 26 could range from 700 MPa to 1,400 MPa; the yield strength (YS) could range from 470 MPa to 1,000 MPa; and the elongation ($e_f$) could range from at least 6% to at least 17% ($L_0$=80 mm and th<3 mm). However, the transition zone 26 introduced can have other properties, depending on the particular material and heating step employed.

Many modifications and variations of the present invention are possible in light of the above teachings and may be practiced otherwise than as specifically described while within the scope of the following claims.

The invention claimed is:

1. A method of manufacturing a structural component, comprising:

providing a first part formed of a first steel material and a second part formed of a second steel material, the first part being joined directly to the second part and thus presenting a joint between the first part and the second part, wherein the first steel material has a first ductility and the second steel material has a second ductility greater than the first ductility;

forming the first part and the second part at a temperature of at least 600° C. after the first part and the second part are joined together;

quenching the first steel material of the first part and the second steel material of the second part after the forming step; and heating a portion of the first part adjacent the joint and a portion of the second part adjacent the joint after the forming and quenching steps to form a transition zone in the portion of the first part adjacent the joint and in the portion of the second part adjacent the joint, the transition zone consisting of the first steel material and the second steel material, the transition zone having a third ductility which is greater than the first ductility of the first part outside of the transition zone and less than the second ductility of the second part outside of the transition zone, wherein the first steel material includes carbon in an amount not greater than 0.25 weight percent (wt. %), manganese in an amount not greater than 1.4 wt. %, silicon in an amount not greater than 0.35 wt. %, chromium in an amount not greater than 0.3 wt. %, boron in an amount not greater than 0.005 wt. %, and a balance of iron, based in the total weight of the first steel material prior to the forming step, and the first steel material has an ultimate tensile strength (UTS) ranging from 500 MPa to 700 Mpa, a yield strength (YS) ranging from 350 MPa to 550 Mpa, and an elongation ($e_f$) of at least 10% ($L_0$=80 mm and th<3 mm) prior to the forming step.

2. The method of claim 1, wherein the first steel material has a first strength, the second steel material has a second strength being less than the first strength, and the heating step includes forming the transition zone to have a third strength between the first strength and the second strength.

3. The method of claim 1, wherein the heating step includes tempering.

4. The method of claim 3, wherein the tempering step includes induction heating.

5. The method of claim 4 including forming a plurality of the structural components each including the transition zone formed by the heating step, and forming at least two of the parts to have transition zones of different areas by using different induction coils during the heating steps.

6. The method of claim 1 including forming the joint between the first part and the second part by laser welding.

7. The method of claim 1, wherein the step of forming the first part and the second part is conducted in a hot forming apparatus, and wherein the heating step is conducted outside of the hot forming apparatus.

8. The method of claim 7, wherein the heating step is conducted in a laser trimming cell.

9. The method of claim 7, wherein the forming step includes providing the shape of a B-pillar.

10. The method of claim 1 including heating the first steel material and the second steel material to a temperature of 900° C. to 950° C. before the forming step, wherein the microstructure of the first steel material transforms to an austenitic microstructure during the forming step, and the microstructure of the second steel material transforms to an austenitic microstructure during the forming step.

11. The method of claim 1, wherein the microstructure of the first steel material transforms from austenite to martensite during the quenching step, and the microstructure of the second steel material transforms from austenite to a mixture of ferrite and martensite during the quenching step.

12. The method of claim 1, wherein the strength of the transition zone decreases continuously in a direction moving from the first part to the second part after the heating step, and the ductility increases continuously in a direction moving from the first part to the second part after the heating step.

13. The method of claim 1, wherein the strength of the transition zone includes an ultimate tensile strength (UTS) from 700 MPa to 1,400 MPa and a yield strength (YS) from 470 MPa to 1,000 MPa.

14. The method of claim 1, wherein the transition zone includes a mixture of ferrite and martensite, the first part includes more martensite than the transition zone, and the second part includes less martensite than the transition zone.

15. The method of claim 1, wherein the ductility varies along the transition zone.

16. The method of claim 1, wherein the ductility of the transition zone is provided by an elongation ($e_f$) of at least 6%.

17. The method of claim 1, wherein the first part joined to the second part together have the shape of a pillar, rail, beam, reinforcement, ring, frame, or body component for an automotive vehicle; and the transition zone has a third ductility which increases in a direction moving from the first part to the second part after the heating step.

\* \* \* \* \*